No. 607,557. Patented July 19, 1898.
E. TURNEY.
FRICTION CLUTCH.
(Application filed Sept. 13, 1897.)
(No Model.)
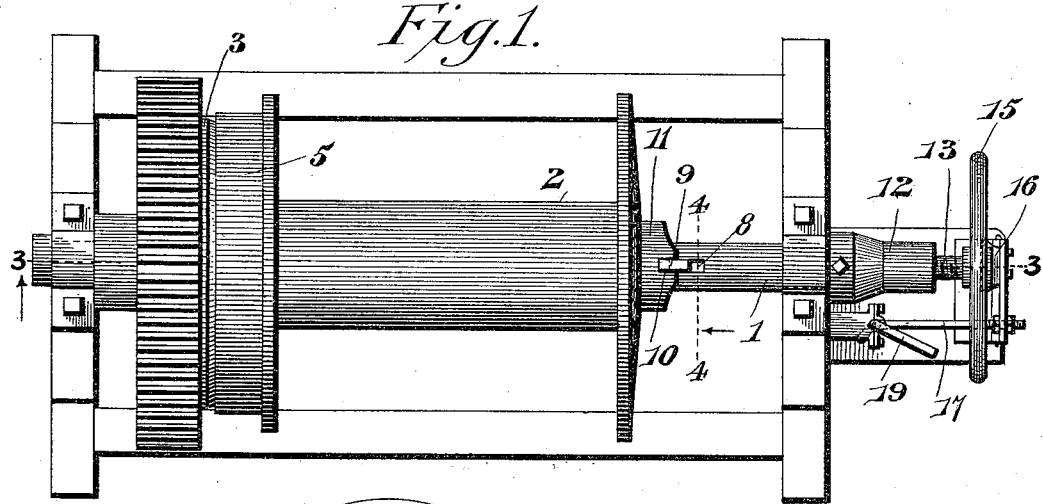
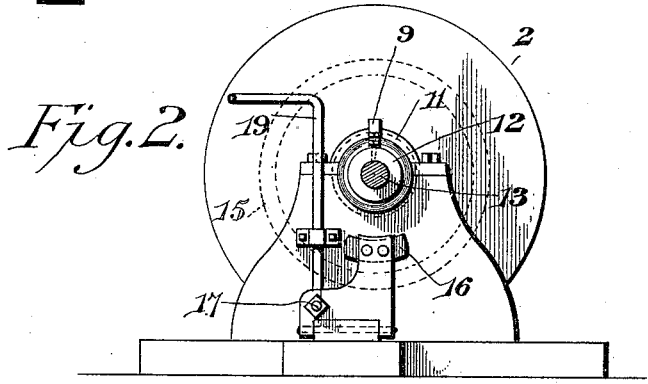
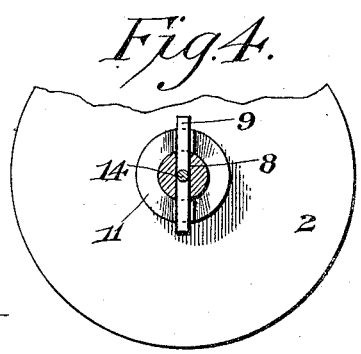
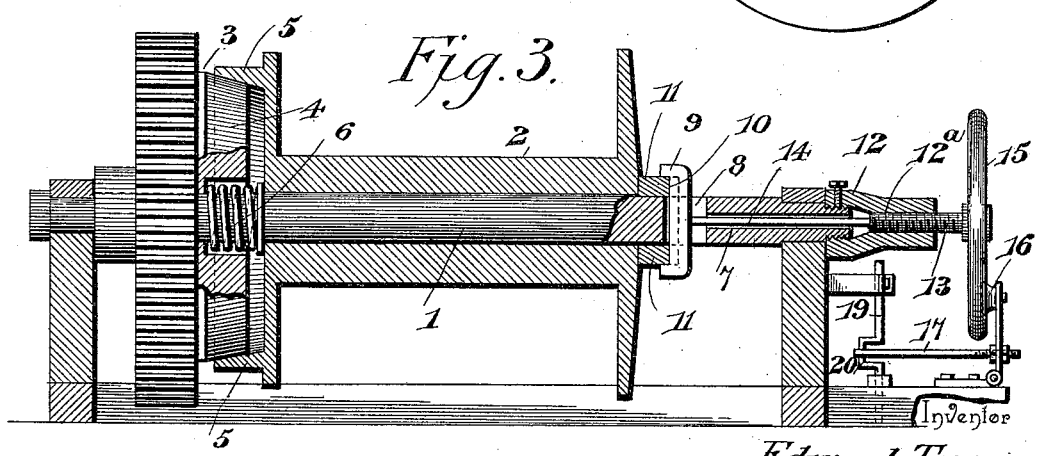
Witnesses
Jack H. McCathran
H. H. Benchof
Inventor
Edward Turney
By his Attorneys,
C. A. Snow & Co.

UNITED STATES PATENT OFFICE.

EDWARD TURNEY, OF PORTLAND, OREGON, ASSIGNOR OF ONE-HALF TO THE SMITH & WATSON IRON WORKS, OF SAME PLACE.

FRICTION-CLUTCH.

SPECIFICATION forming part of Letters Patent No. 607,557, dated July 19, 1898.

Application filed September 13, 1897. Serial No. 651,482. (No model.)

*To all whom it may concern:*

Be it known that I, EDWARD TURNEY, a citizen of the United States, residing at Portland, in the county of Multnomah and State of Oregon, have invented a new and useful Friction-Clutch, of which the following is a specification.

My invention relates to improvements in friction-clutches which may be used on logging, hoisting, or stationary engines; and the object that I have in view is to provide an improved clutch which will reduce to a minimum the friction and wear on the working parts of the engine.

A further object of the invention is to provide mechanism by which the clutch may easily and quickly be adjusted when the engine is running or at rest to throw a winding-drum into or out of engagement with the driving-shaft.

It is common in logging-machines to provide a winding spool or drum on a shaft carrying a clutch which is controlled by a nut connected to the frame or engine-bed and handled by a lever. This causes a great loss of power and in the long run the parts heat, due to the friction and wear. I overcome these objections and attain the objects of my invention by the novel combination of elements and the construction and arrangement of parts constituting my improvements, all as will be hereinafter fully described and claimed.

To enable others to understand my invention, I have illustrated the preferred embodiment thereof in the accompanying drawings, forming a part of this specification, and in which—

Figure 1 is a plan view showing a winding spool or drum, its shaft, and a clutch mechanism constructed in accordance with my invention. Fig. 2 is an end elevation. Fig. 3 is a sectional view taken on the plane indicated by the dotted line 3 3 of Fig. 1. Fig. 4 is a transvere section through the driving-shaft on the plane indicated by the dotted line 4 4 of Fig. 1, looking in the direction indicated by the arrow.

Like numerals of reference denote corresponding parts in all the figures of the drawings, referring to which—

1 designates the shaft for the spool or drum 2. This shaft is journaled in suitable bearings on the frame or bed of an engine, which I have not deemed it necessary to show. The spool or dum 2 is mounted loosely on the shaft in order that the shaft may rotate within the drum or spool and that the drum or spool may have a limited sliding movement on said shaft. Near one end the shaft is provided with a clutch-disk 3, having a laterally-projecting flange or rim 4, and the spool or drum is constructed with a flange or rim 5, which extends toward the clutch-disk in order that the flanges 4 5 may engage when the spool or drum is moved endwise in one direction. The spool or drum is moved endwise on the shaft away from the clutch-disk 3 by means of a coiled spring 6, which is fitted to the shaft to have its ends seated against the clutch-disk and the friction drum or spool; but this mechanism is an obvious expedient, and equivalent devices may be substituted therefor as deemed desirable by a skilled mechanic.

The driving-shaft 1 at its end opposite to that part having the clutch-disk is provided with a longitudinal axial bore or passage 7 and with a transverse or radial slot 8, the bore or passage and the radial slot opening into one another, as shown. Through this radial slot is fitted a jaw-shaped plate 9, which is free to have a limited sliding movement in the slot 8, and the jaws at the extremities of said plate engage with notched seats 10, provided at diametrically opposite points in a loose sleeve or collar 11. This sleeve or collar is fitted freely on the shaft 1 to enable the shaft to turn freely within the collar or sleeve and for the sleeve to have sliding movement on the shaft with the plate 9, which is interlocked with said sleeve or collar, and against said sleeve or collar abuts one of the heads of the drum or spool 2.

The bored end of the driving-shaft 1 carries a nut 12, and in this nut works an adjusting-screw 13, which is arranged to move endwise a friction pin or stem 14, all of these parts being carried by the shaft to rotate therewith and enable the shaft to turn freely in its bearings on the bed or frame of the engine.

The nut 12 may be attached to the end of the driving-shaft, or said nut may be made solid with or as an integral part of the driving-shaft, so that the nut is caused to rotate with the driving-shaft. In case the nut is made separate from the driving-shaft I arrange the shaft with a screw-threaded end to receive a thread of the nut and employ a binding-screw to hold the nut and shaft rigidly together to insure rotation of the parts. The nut 12 takes the place of the ordinary collar provided on the end of the shaft, and the nut is provided with an internally-threaded opening or socket $12^a$, which is in alinement with the axial bore or passage 7 in the driving-shaft.

The slidable pin or stem 14 is fitted loosely in the axial bore 7 of the driving-shaft, and the inner end of this pin abuts or impinges against the slidable transverse plate 9, fitted in the slot 8 of the shaft.

The adjusting-screw 13 is fitted in the internally-threaded opening or socket of the nut 12, and the inner end of this screw is arranged to abut against the stem or pin 14 in order to impel the stem or pin endwise. It will be observed that the stem or pin 14 is between the adjusting-screw and the transverse plate 9, which is coupled to the loose collar or sleeve against which the spool or drum 2 bears, and when the screw is turned outwardly and away from the stem or pin the spring forces the drum or spool endwise on the shaft sufficient for the flange on the drum or spool to clear the flange on the friction-disk of the shaft, thus disengaging the spool or drum from rigid engagement with the shaft; but when the screw is rotated in the reverse direction, so as to advance the screw toward the stem or pin, the latter is moved endwise to adjust the plate 9, the collar 11, and the spool or drum, so as to move the flange or rim of the spool or drum into tight engagement with the friction-disk 3, thus clutching the spool or drum to the shaft and causing the drum to rotate with said shaft.

The adjusting-screw 13 is provided with a hand-wheel 15 or other equivalent device for the purpose of rotating said screw conveniently by hand to enable it to adjust the stem to move the spool or drum into engagement with the drum. I have also provided means whereby the screw may be adjusted when the shaft 1 is in motion and without requiring the operator or attendant to grasp the hand-wheel. This part of my invention consists in providing a movable brake-shoe 16, which is carried on one end of a movable upright arm that has its lower end attached to the bed-plate by a pivot which lies at right angles to the axial line of the drum-shaft, so that the brake-arm and shoe are movable toward and from the face of the hand-wheel. This brake is adapted to be applied against the exposed lateral face or side of the hand-wheel 15 to retard or arrest the rotation of the hand-wheel and screw. The brake-shoe is operatively connected by a link 17 to a hand-operated shaft or rod 19, which is suitably journaled or mounted on the engine frame or bed, and this shaft or rod is provided with a crank 20, to which is connected the link or pitman 17, that serves to move the friction brake-shoe 16. When the shaft is in motion and the spool or drum is unclutched therefrom, it is desirable frequently to clutch the spool or drum to the shaft without stopping the engine. Under these conditions it is only necessary for the attendant to adjust the rod or shaft 19 in a manner to apply the brake-shoe against the hand-wheel of the adjusting-screw, and the pressure of the brake against this hand-wheel retards or arrests the latter sufficiently to insure the screw turning into the rotating shaft and moving the slidable pin or stem to adjust the spool or drum and cause it to engage with the friction-disk 3, thus clutching the spool or drum to the shaft while it is in motion. In my improved structure the brake-arm is hung or pivoted to permit the arm and shoe of the brake to move in the direction of endwise movement of the screw-spindle to adjust the clutch, and such arrangement permits the brake to remain always in proper operative relation to the hand-wheel. The hand-wheel provides a convenient means for adjusting the screw to make the spool or drum fast to the shaft and to free it from the shaft when the engine is at rest, such adjustment of the screw and hand-wheel being effected by hand. When the shaft is in motion, it is desirable to employ the lever-controlled brake to adjust the screw, because such devices relieve the operator of all liability to having his hand injured by the rotating hand-wheel. When the drum is clutched to the shaft and the shaft and drum are in motion, it is desirable to stop the engine previous to adjusting the hand-wheel to unclutch the drum from the shaft and allow the drum to remain idle on the shaft.

From the foregoing description it will be understood that the means for adjusting the spool or drum into and out of engagement with the shaft is rotatable with said shaft, and this construction and arrangement obviate strain against the shaft or the engine frame and bed.

The operating devices for the spool or drum are connected with one end of the driving-shaft, so that when pressure is applied to said operating devices the strain is entirely on the shaft itself, thus leaving the shaft free to revolve in its bearings on the engine-bed. The pressure and strain being taken off the shaft-collar, the shaft is free to revolve, giving more power to the engine, effecting a material saving in time and in the cost of operating the engine and also allowing the engine to run at a higher speed because of the diminution of friction and wear on the working parts.

It is thought that the construction, operation, and the advantages of my improvement will be readily understood from the foregoing description taken in connection with the drawings.

I am aware that changes in the form and proportion of parts and in the details of construction may be made by a skilled mechanic without departing from the spirit or sacrificing the advantages of my invention. I therefore reserve the right to make such modifications and alterations as fairly fall within the scope of the invention.

Having thus fully described my invention, what I claim as new, and desire to secure by Letters Patent, is—

1. The combination with a drum, its shaft and an endwise-movable clutch-adjusting screw-spindle carried by said drum-shaft, of a brake mechanism substantially as described having a brake-arm pivoted and adapted to move in the direction of movement of said spindle and adapted to retard the latter when the shaft and spindle are in motion, for the purpose described, substantially as set forth.

2. The combination with a drum, its shaft, a nut carried thereby, and an endwise-movable spindle mounted in said nut and carrying a hand-wheel, of a brake-arm hung by a transverse pivot and movable toward or from the face of the hand-wheel in the direction of the endwise adjustment of said spindle, a brake-shoe carried by said brake-arm to ride against the face of the hand-wheel, and means connected to the brake-arm to adjust the latter, substantially as described.

In testimony that I claim the foregoing as my own I have hereto affixed my signature in the presence of two witnesses.

EDWARD TURNEY.

Witnesses:
   J. FRANK WATSON,
   GEO. W. HOYT.